(12) United States Patent
Werner et al.

(10) Patent No.: US 11,080,722 B2
(45) Date of Patent: Aug. 3, 2021

(54) METHODS AND SYSTEMS FOR MULTICHANNEL MICRO-INTERACTIONS

(71) Applicant: FAIR ISAAC CORPORATION, Roseville, MN (US)

(72) Inventors: Benjamin Robert Werner, Bozeman, MT (US); Charles Edward McDaniel, Seattle, WA (US); Jeanette Ann Groustra, San Rafael, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 396 days.

(21) Appl. No.: 15/271,538

(22) Filed: Sep. 21, 2016

(65) Prior Publication Data
US 2018/0082311 A1     Mar. 22, 2018

(51) Int. Cl.
| G06Q 10/00 | (2012.01) |
| G06Q 30/02 | (2012.01) |
| H04L 29/08 | (2006.01) |
| H04L 12/58 | (2006.01) |
| H04L 29/06 | (2006.01) |

(52) U.S. Cl.
CPC ......... *G06Q 30/0201* (2013.01); *H04L 51/16* (2013.01); *H04L 51/32* (2013.01); *H04L 67/22* (2013.01); *H04L 67/306* (2013.01); *H04L 69/14* (2013.01)

(58) Field of Classification Search
CPC ....................................................... H04L 67/26
USPC ....................................................... 705/7.29
See application file for complete search history.

(56) References Cited

U.S. PATENT DOCUMENTS

| 8,782,127 B2 * | 7/2014 | Addala | ............... H04L 12/4625 709/203 |
| 10,102,536 B1 * | 10/2018 | Hickman | ........... G06Q 30/0205 |

(Continued)

OTHER PUBLICATIONS

Sophie, Jeanpert & Pache, Gilles. (2016). Successful multi-channel strategy: mixing marketing and logistical issues. Journal of Business Strategy. 37. 12-19. 10.1108/JBS-05-2015-0053. (Year: 2016).*

*Primary Examiner* — Joseph M Waesco
*Assistant Examiner* — Jay-Ming Wang
(74) *Attorney, Agent, or Firm* — Mintz Levin Cohn Ferris Glovsky and Popeo, P.C.

(57) ABSTRACT

Various systems and methods for managing multichannel content delivery are presented. A multichannel content server system may use an application programming interface (API) for interfacing with a plurality of end-user communication channels. An end-user interaction database may store interaction data for a plurality of end-users. An end-user-specific preference profile may be created based on a first end-user interaction received via a first end-user communication channel stored to the end-user interaction database for a particular end user. A request may be received originating from an end-user computing device of the end-user via a second end-user communication channel. A client-specific engagement profile may be loaded and evaluated based on the created end-user-specific preference profile. Based on the client-specific engagement profile evaluated based on the end-user-specific preference profile, content may be selected then transmission to an end-user system.

20 Claims, 8 Drawing Sheets

(56) References Cited

U.S. PATENT DOCUMENTS

| | | | | |
|---|---|---|---|---|
| 2007/0087756 | A1* | 4/2007 | Hoffberg | G06Q 20/40 |
| | | | | 455/450 |
| 2009/0320073 | A1* | 12/2009 | Reisman | G06F 16/954 |
| | | | | 725/51 |
| 2012/0150651 | A1* | 6/2012 | Hoffberg | G06F 3/0482 |
| | | | | 705/14.58 |
| 2012/0164613 | A1* | 6/2012 | Jung | G06Q 30/02 |
| | | | | 434/236 |
| 2013/0297689 | A1* | 11/2013 | Bhat | H04L 51/32 |
| | | | | 709/204 |
| 2014/0067958 | A1* | 3/2014 | Bradley | H04L 67/306 |
| | | | | 709/204 |
| 2014/0120864 | A1* | 5/2014 | Manolarakis | G06Q 30/0251 |
| | | | | 455/405 |
| 2014/0207518 | A1* | 7/2014 | Kannan | G06Q 30/0201 |
| | | | | 705/7.29 |
| 2014/0282094 | A1* | 9/2014 | Levine | H04W 4/02 |
| | | | | 715/753 |
| 2014/0282162 | A1* | 9/2014 | Fein | G06F 3/013 |
| | | | | 715/769 |
| 2015/0163311 | A1* | 6/2015 | Heath | G06Q 30/0236 |
| | | | | 709/204 |
| 2016/0162912 | A1* | 6/2016 | Garel | G06Q 30/0224 |
| | | | | 705/7.34 |
| 2016/0285798 | A1* | 9/2016 | Smullen | H04L 51/046 |

* cited by examiner

METHODS AND SYSTEMS FOR MULTICHANNEL MICRO-INTERACTIONS

BACKGROUND

Feedback from users is an important mechanism for entities, such as businesses, to understand how they are performing. Entities frequently direct their customers to a survey, such as provided on the web or telephonically by an agent of the entity. In such a survey, a customer answers various questions, which could number in the dozens and may take a significant amount of time to complete. To illustrate the challenge of customer engagement in a multichannel world, data suggest that response rates for site-intercept web surveys was less than 1% in 2015 and that the latest data show an ongoing trend for decreasing engagement with web surveys since they were first introduced. This creates a very real problem for a business as they may not be able to create high enough quality of data for their market research and survey efforts which are critical to ensure future business growth.

Further, new consumer technologies are developing at a rapid pace (e.g., the Internet, augmented reality, social, mobile, etc.) and each new technology creates additional demands for a person's attention, which often cause shorter and more distracted usage. The availability of multiple channels through which a person can engage with a business makes it exceedingly difficult for a business to maximize its engagement of persons on any given channel, let alone deliver great experiences across channels when one individual may use a portion of multiple channels to complete a sale—for instance starting his purchasing experience on a social channel to ask his friends for their recommendations, then performing a web search on his mobile device to learn more, then calling a company representative via audio to ask some questions, and then finally completing his transaction on his laptop at a later date.

SUMMARY

In some embodiments, a multichannel end-user content system is presented. The system may include a multichannel content server system. The server system may include an application programming interface (API) for interfacing with a plurality of end-user communication channels. The server system may include an end-user interaction database that maintains entries for a plurality of end-users. For each end user, an end-user-specific identifier is linked with a client identifier and a plurality of multichannel end-user interactions. A first end-user interaction of the plurality of multichannel end-user interactions may have been received by the multichannel content server system by the API based on a first engagement provided to the end-user via a first end-user communication channel of the plurality of end-user communication channels for a client. The server system may include a processing system that creates an end-user-specific preference profile based on the first end-user interaction stored to the end-user interaction database. The processing system may receive, via the API, a web-based request originating from an end-user computing device of an end-user of the plurality of end-users. The web-based request may be indicative of the end-user engaging with the client via a second end-user communication channel of the plurality of end-user communication channels. The web-based request can be generated based on the end-user activating an engagement element presented on a client-served web page. The web-based request may include the end-user-specific identifier and the client identifier. A client-specific engagement profile may be loaded and evaluated, from a plurality of client-specific engagement profiles, based on the created end-user-specific preference profile. Based on the client-specific engagement profile evaluated based on the end-user-specific preference profile, web-based content to transmit to an end-user system to be output in association with the client-served web page may be determined by the processing system. The web-based content may be caused to be transmitted by the processing system to the end-user system for presentation on the client-served web page.

Embodiments of such a system may include one or more of the following features: The processing system may receive, in response to the web-based content, an interaction message generated by the end-user computing device comprising: the end-user-specific identifier and an indication that the end-user has dismissed the web-based content. The processing system may store, to the end-user interaction database, an indication of the dismissed web-based content linked with an indication of the second communication channel and the end-user-specific identifier. The processing system may update the end-user-specific preference profile based on the end-user having dismissed the web-based content. Creating the end-user-specific preference profile may be based on a set of global preferences, the global preferences defining likelihoods of the plurality of end-users interacting with a plurality of types of content. The end-user-specific preference profile may be created based on interactions by the end-user with content via at least two end-user communication channels. The processing system may create the client-specific engagement profile based on: client-provided content and client-specific bias rules. Client-specific bias rules may be used to determine content to be provided to the end-user based on one or more likelihoods stored in the end-user-specific preference profile. The end-user-specific preference profile may indicate a plurality of percentage likelihoods, each percentage likelihood indicating a likelihood that the end-user will perform a particular action. The processing system may receive, via the API, a second web-based request originating from the end-user system. The second web-based request may be generated based on the end-user activating a second engagement element on the client-served web page. The second web-based request may include the end-user-specific identifier. The processing system may load and evaluate the client-specific engagement profile and the end-user-specific preference profile, wherein the end-user-specific preference profile is updated based on the indication of the dismissed web-based content. The processing system may determine, based on the executed client-specific engagement profile, a second piece of web-based content to transmit to the end-user system to be output in association with the client-served web page. The processing system may transmit the piece of web-based content to the end-user system for presentation in association with the client-served web page. The processing system may determine that the end-user has ignored the web-based content. The processing system may storing, to the end-user-interaction database, an indication of the ignored web-based content linked with an indication of the second communication channel and the end-user-specific identifier. The processing system may update the end-user-specific preference profile based on the end-user having ignored the web-based content. The processing system may receive, via the API, a second web-based request originating from the end-user computing device. The second web-based request may be generated based on the end-user activating a second engagement element on a second client-served web page. The second web-based request may include the end-user-specific identifier. The processing system may load and evaluate the client-specific engagement profile based on the created end-user-specific preference profile, wherein the created end-user-specific preference profile is updated based on the ignored web-based request. The processing system may load and execute the client-specific engagement profile, using one or more end-user interactions received via the API and the indication of the ignored interactive web-based query. The processing system may determine, based on the client-specific engagement profile evaluated based on the end-user-specific preference profile, a second piece of web-based content to transmit to the end-user computing device to be output on the second client-served web page. The processing system may cause the second web-based content to be transmitted to the end-user computing device for presentation on the client-served web page. The API may be configured to interact with an interactive voice response (IVR) system. The API may receive requests from instances of a native application of the client being executed using end-user mobile devices and the first end user communication channel is a native application communication channel. The API may receive short messaging service (SMS) data from an end user mobile device and the first end user communication channel is an SMS communication channel. The API may receive chat communication data from an end user mobile device and the first end user communication channel is a chat communication channel.

In some embodiments, a method for managing multichannel end-user interactions may be presented. The method may include receiving, via an API of a multichannel end-user content server system, a first-end user interaction based on a first engagement provided to an end-user via a first end-user communication channel of a plurality of end-user communication channels available for a client. The method may include storing, by the multichannel end-user content server system, the first end-user interaction to an end-user interaction database. The end-user interaction database may maintain entries for a plurality of end-users comprising the end-user. The method may include creating, by the multichannel end-user content server system, an end-user-specific preference profile for the end-user based on the first end-user interaction stored to the end-user interaction database. For each end-user, an end-user-specific identifier may be linked with a client identifier and one or more multichannel end-user interactions. The method may include receiving, via the API of the multichannel end-user content server system, a web-based request originating from an end-user computing device of the end-user. The web-based request may be indicative of the end-user engaging with the client via a second end-user communication channel of the plurality of end-user communication channels. The web-based request may be generated based on the end-user activating an engagement element presented on a client-served web page. The web-based request may include the end-user-specific identifier and the client identifier. The method may include evaluating, by the multichannel end-user content server system, a client-specific engagement profile, from a plurality of client-specific engagement profiles, based on the created end-user-specific preference profile. The method may include determining, by the multichannel end-user content server system, based on the client-specific engagement profile evaluated based on the end-user-specific preference profile, web-based content to transmit to an end-user system to be output in association with the client-served web page. The method may include outputting, by the multichannel end-user content server system, the web-based content to the end-user system for presentation as part of the client-served web page.

Embodiments of such a method may include one or more of the following features: The first end-user communication channel may include an augmented reality interface and the first end user interaction is received via the augmented reality interface. The first end-user communication channel may include an interactive voice response (IVR) system and the first end-user interaction comprises a vocal response received via the IVR system. The method may include receiving, by the multichannel end-user content server system, in response to the web-based content, an interaction message generated by the end-user computing device comprising: the end-user-specific identifier and an indication that the end-user has dismissed the web-based content. The method may include storing, by the multichannel end-user content server system, to the end-user interaction database, an indication of the dismissed web-based content linked with an indication of the second communication channel and the end-user-specific identifier. The method may include updating, by the multichannel end-user content server system, the end-user-specific preference profile based on the end-user having dismissed the web-based content. The method may include creating the end-user-specific preference profile is further based on a set of global preferences, the global preferences defining likelihoods of the plurality of end-users interacting with a plurality of types of content. The end-user-specific preference profile may indicate a plurality of percentage likelihoods, each percentage likelihood indicating a likelihood that the end-user will perform a particular action.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

When an end-user interacts with an entity (e.g., a business, non-profit, organization, club, etc.), he may do so via multiple technically-implemented communication channels. As an example, a user may visit an entity's web page, access the entity's native application on his mobile phone, call and interact with an interactive voice response system operated by the entity, and visit the entity's social media page. While the end-user may be unlikely to read large amounts of text or specifically agree to complete a lengthy survey and dedicate the time necessary to do so, the end-user may be more likely to read or otherwise view small amounts of content or provide small amounts of feedback or input across multiple communication channels that do not substantially interfere with the end-user's interactions with the entity via such communication channels. Such small viewing, feedback, or input interactions can be created at a level that requires only viewing or a single user input, such as a click, swipe, tap or other simple interaction that can be performed by a user in a very short amount of time (e.g., fractions of a second up to tens of seconds). While such a simple action, feedback, or input may not individually provide the entity with much information, when such an action, feedback, or input is gathered across multiple communication channels and is compiled together, a substantial amount of feedback from individual end-users can be analyzed to: 1) obtain significant and meaningful feedback or input about the entity from the end-user; and 2) determine likelihoods of the end-user providing feedback or otherwise engaging with the entity via specific communication channels, in specific formats, and/or to specific types of queries.

Generally, this document discusses the concept of gathering feedback from end users. It should be understood that the concepts detailed herein can be applied to other forms of data. For example, more generally than feedback, the methods and systems detailed herein can be used to present end users with data and/or gather and analyze end user interactions across various communication channels.

Therefore, a feedback system that intertwines feedback content with an entity's user experience across multiple communication channels via simple feedback interactions can allow an entity to obtain useful feedback from its user base. Further, by compiling feedback interactions across multiple communication channels, in addition to gathering more feedback, a determination can be made as to the types of feedback queries that are most likely to be engaged by a particular end-user and types of feedback queries determined to annoy the end-user can be eliminated from one or more communication channels.

Figure 1:
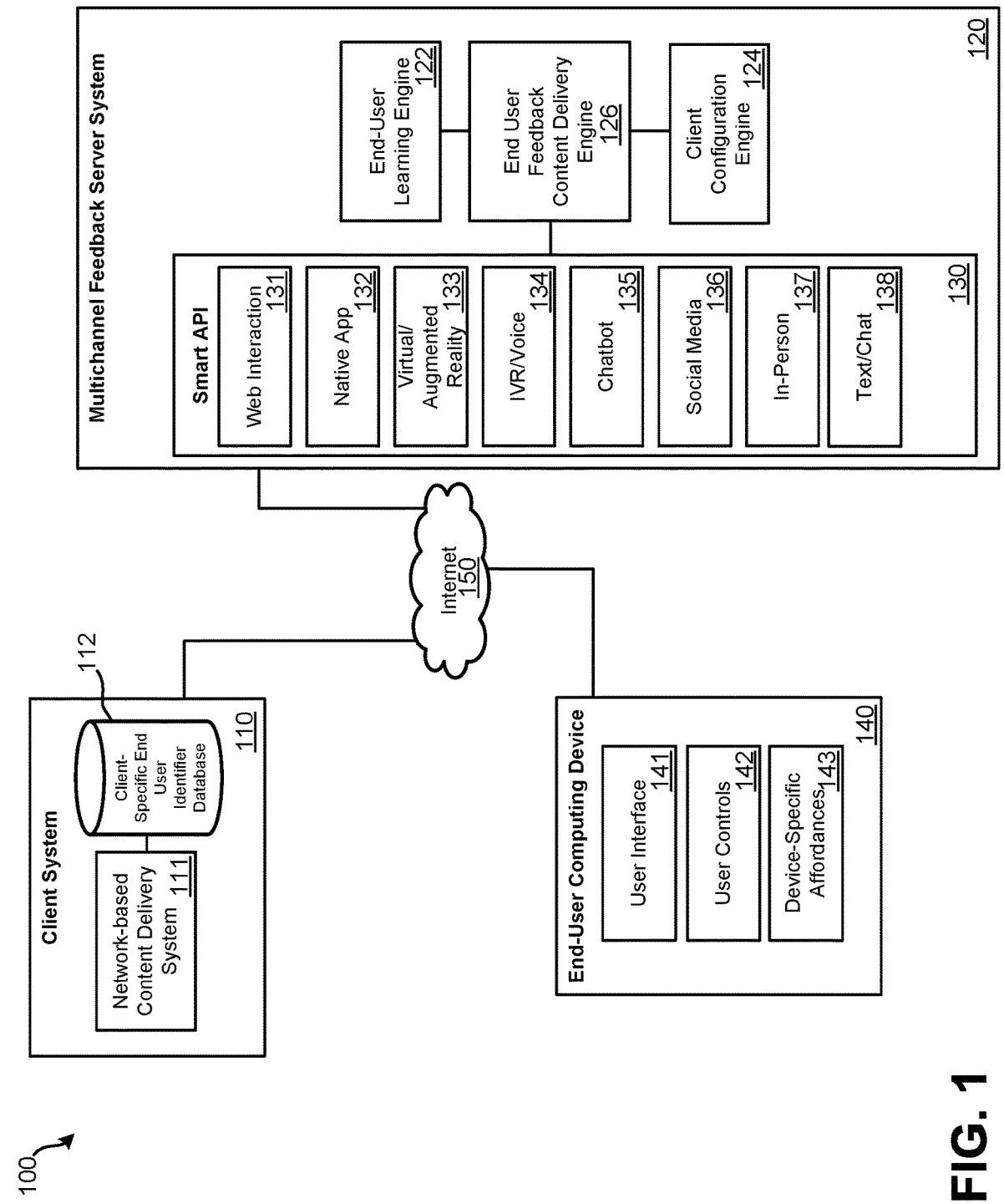
FIG. 1 illustrates an embodiment of an end-user multi-channel engagement and feedback system.

FIG. 1 illustrates an embodiment of an end-user multichannel feedback and engagement system 100. End-user multichannel feedback and engagement system 100 allows multiple end-users to engage with content and, possibly, provide feedback or input for multiple entities, referred to as clients, via a cloud-based multichannel feedback and engagement server system. The cloud-based multichannel feedback and engagement server system (referred to as a multichannel feedback server system, "MCFSS," or multichannel content server system) executes a smart application programming interface (API) that allows the MCFSS to interact with multiple communication channels, possibly at the same time. Three components of system 100 are illustrated in FIG. 1: client system 110, MCFSS 120, and end-user computing device 140.

Client system 110 represents a computerized system of a client that is using MCFSS 120 to gather, analyze, and control how feedback or interactions are solicited from end-users associated with the client and/or control information is presented to end-users. It should be understood that MCFSS 120 may gather, analyze, and control feedback for many clients over a same period of time. For instance, hundreds of clients may use MCFSS 120 to provide feedback or, more generally, content delivery services. For simplicity, a single client system, client system 110, is illustrated that represents how a client system may interact with an end-user computing device and MCFSS 120.

Client system 110 may, via a network such as Internet 150, provide various services to end-users via end-user computing devices and various communication channels. Client system 110 may interact with end-users via: the web (e.g., a web page, a support portal), a mobile-device executed application, virtual or augmented reality, an interactive voice response (IVR) system, a chatbot system (e.g., a text-based chatting arrangement in which responses to the end-user are determined by a computer system), social media (e.g., Facebook®, Twitter®), text messaging (e.g., SMS, MMS), human-performed chat (e.g., in a text-based chat interface), or voice. Network-based content delivery system 111 of client system 110 may allow data to be served to various end-user computing devices via any of such communication channels. Network-based content delivery system 111 may, upon receiving a request, transmit a webpage to an end-user computing device 140, or provide content for presentation in a native application. As another example, in response to a social media interaction on a social media page of the client, a social media message (e.g., post, private message) may be sent to the end-user. As still another example, client system 110 may host an IVR system that allows an end-user to navigate through various voice-based prompts to gather information, request a service, or be connected with a customer service representative.

Such services, via various communication channels, may be provided by client system 110 or another system under the control of the client (e.g., an outsourced IVR system). Client system 110 may track which end-user it is interacting with via different communication channels. Regardless of the communication channel that an end-user communicates with client system 110, client system 110 may relate the end-user to an end-user identifier stored in client-specific end-user identifier database 112. This identifier may be determined by having the end-user identify himself. How the user identifies himself may vary based on which communication channel the end-user is communicating with client system 110. For instance, if the end-user has requested a web page from client system 110 via end-user computing device 140, an IP address of end-user computing device 140 may be combined with other methods and used to determine the identifier associated with the end-user. In another embodiment, the end-user may be required to provide a username and password. In some embodiments, a cookie-based identification scheme may be used or some other form of end-user computer device local storage based identification. For an IVR-based interaction, the end-user may be identified by his calling phone number or may need to provide an account number or provide other identifying information. Regardless of the communication channel used by the end-user to contact client system 110, client system 110 may be able to: provide information in response to the request via network-based content delivery system 111 and identify the end-user and look-up an associated identifier from end-user identifier database 112. The content provided by network-based content delivery system 111 to the end-user may have the identifier associated with the end-user that has been retrieved from client-specific end-user identifier database 112 embedded.

The content provided by client system 110 to the end-user may be provided to the end-user via end-user computing device 140. End-user computing device 140 may take various forms, including: a desktop computer system, laptop, or mobile device (e.g., smartphone, tablet computer). User interface 141 may include a display screen and/or an audio output. User controls 142 may provide various ways for the end-user to interact with content provided by client system 110 to end-user computing device 140, such as a touchscreen, keyboard, mouse, etc. Depending on the type of end-user computing device, end-user computing device 140 may have various device-specific affordances 143. Such affordances may allow for specific forms of interactions based on user interface 141 and user controls 142. Device-specific affordances 143 may include: swipes (on a touch screen), pinches (on a touch screen), taps (on a touch screen), click (using a mouse or touchpad), scroll actions (using a mouse or touchpad, etc.), voice input (on IVR and audio based mediums), location and movement sensing (on mobile devices), and gestures (on augmented or virtual reality).

As an example of how end-user computing device 140 may interact with client system 110, an end-user, via end-user computing device 140 may input and request a URL via Internet 150 that directs to client system 110. In response, client system 110 may serve a webpage to end-user computing device 140 that includes an embedded identifier associated with the particular end-user.

Figure 8:
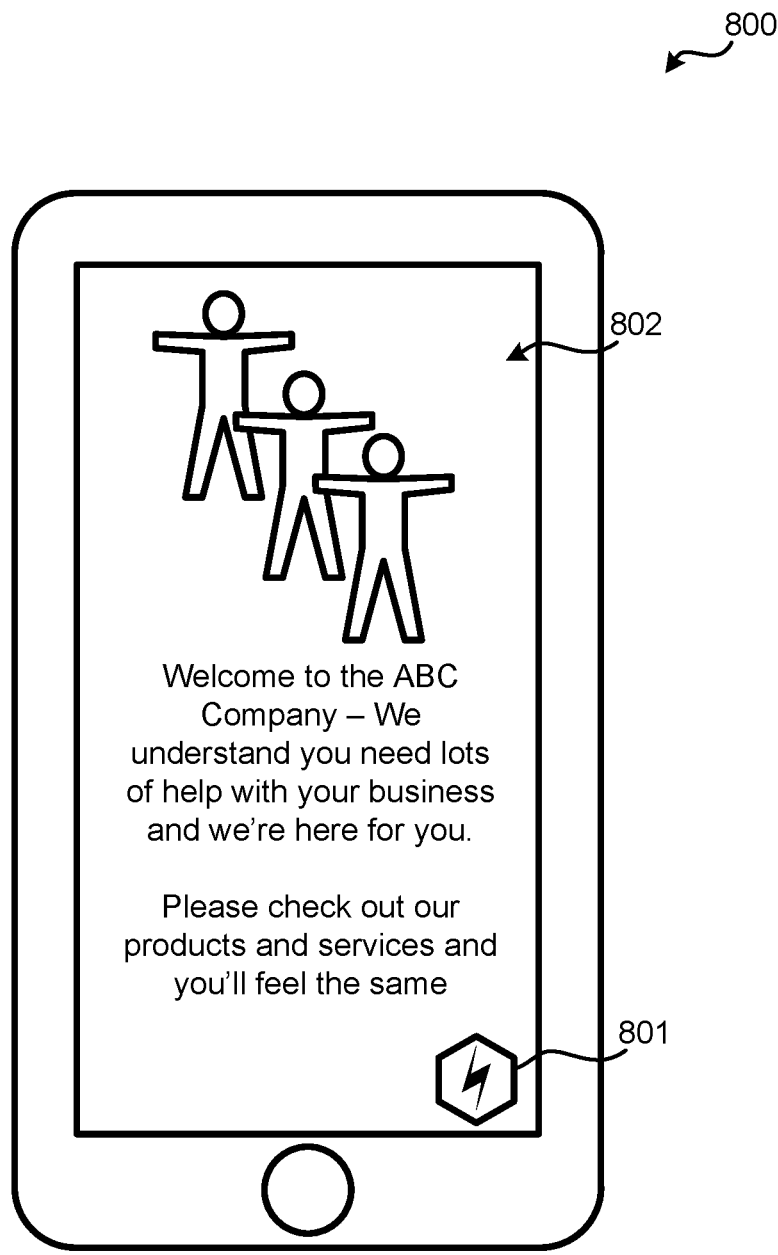
FIG. 8 illustrates an embodiment of a subtle engagement cue presented within a native application being executed by a mobile device.

Through each of the various communication paths discussed, it may be possible for MCFSS 120 to provide either a subtle engagement cue or active engagement via the communication channel in an attempt to provide information or solicit feedback or another form of interaction with the end-user or offer content to the end-user. A "subtle engagement cue" can refer to a visual prompt or other form of prompt that is secondary (e.g., smaller, off to the side, unobtrusive, and/or in the periphery of awareness) to other, primary content being presented to the end-user. A subtle engagement cue may not specify its specific purpose, but may attract user attention while still allowing the end-user to engage with other content. A subtle engagement cue may not be displayed unless a user is interacting with a region of a user interface that is proximate to where the subtle engagement would be presented. The subtle engagement cue may present little or no information but may be an interactive element that allows a user to select the subtle engagement cue using a device-specific performance, such as a tap of the subtle engagement cue. For example, a subtle engagement cue within a native application being executed by a mobile device is illustrated in embodiment 800 of FIG. 8. Subtle engagement cue 801 does not interfere with the end-user's interaction with the native application 802, but may attract the end-user's attention sufficiently that the end-user, clicks, taps, or otherwise selects subtle engagement cue 801, which would trigger the presentation of active content to the end-user in place of subtle engagement cue 801. Selection of a subtle engagement cue may retrieve an active engagement from MCFSS 120. An active engagement may be a form of content, such as feedback content, that more directly engages the end-user, such as via a visual or auditory prompt asking whether the user answered a question or by providing an opportunity for the end-user to provide feedback, which may typically be in the form of a single question, message, real-time guidance, or other form of statement or some other form of content. An active engagement may also invite the end-user to communicate with the client via another communication channel, such as via voice communication. Via some communication channels, an active engagement may be provided to the end-user without a preceding subtle engagement cue, but a subtle engagement cue may always lead to an active engagement which can be provided by MCFSS 120.

When client system 110 provides content to end-user computing device 140, a subtle engagement cue or active engagement may be included. If an end-user activates the subtle engagement cue or active engagement via end-user computing device 140, MCFSS 120 may be contacted. That is, a subtle engagement cue may be provided as part of a website served by client system 110 to end-user computing device 140. This subtle engagement cue may be a graphical element that can be tapped or clicked by a user and is linked with the identifier of the client and is configured to contact MCFSS 120 if selected by the end-user. In other embodiments, such as if the client system provides end-user computing device 140 with a webpage, code may be included that causes end-user computing device 140 to retrieve the subtle engagement cue from MCFSS 120.

MCFSS 120 may include a smart API 130 that allows MCFSS 120 to communicate via various communication channels with end-users for various clients, including client system 110. Smart API 130 may, in response to a subtle engagement cue being selected by user, provide active engagement content by end-user feedback content delivery engine 126 (or, more generally, content delivery engine 126) as determined by end-user learning engine 122 and client configuration engine 124. Smart API 130 may include at least some of the following components: Web interaction component 131, native application component 132, virtual/augmented reality three, IVR/voice component 134, chatbot component 135, social media component 136, in person component 137, and text/chat component 138. Web interaction component 131 may be used to receive and respond to requests originating from user selection of a subtle engagement cue on a client-served webpage. Native application component 132 may be used to receive and respond to requests originating from user selection of a subtle engagement cue within a native application executed by end-user computing device 140. Virtual/Augmented Reality component 133 may handle communication with various virtual/augmented reality systems and may be used to receive and respond to requests originating from user selection of a subtle engagement cue within a virtual or augmented reality environment. IVR/Voice component 134 may be triggered by client system 110 to provide active engagement with the end-user (that is, forgoing a subtle engagement cue). In the case of IVR/Voice component 134, the identifier of the end-user may be provided to MCFSS 120 by client system 110 rather than a system of the user. Depending on how various communication channels are implemented, client system 110 may provide the identifier that allows the end-user to be identified rather than such an identifier being provided directly by the end-user or an end-user computing device being operated by the end-user. Chatbot component 135 may be used to receive and respond to requests originating from user selection of a subtle engagement cue presented in relation to a chat window through which the end-user is interacting with the chatbot service. Social media component 136 may be used to receive and respond to requests originating from user selection of a subtle engagement cue on a social media service. Web Interaction component 131 may be used to receive and respond to requests originating from user selection of a subtle engagement cue when performing in-person interactions with a representative of the client of client system 110. For example, a tablet computer or other computing device may be placed to the side that flashes, displays, or sounds to provide a subtle engagement cue. During or upon completion of the in-person interaction, the end-user may interact with the subtle engagement cue, triggering an interaction with MCFSS 120. Text/Chat component 138 of smart API 130 may allow for active engagement (possibly without the presentation of a subtle engagement cue) via voice or text with an end-user following or during other interactions with the end-user across such a communication channel. For instance, via SMS texts and other mobile messaging applications, it may not be possible to provide a subtle engagement cue; so it is logical to jump directly to active engagement. Another possible communication would be through various Internet of Things (IoT) devices, such as interfaces being executed on appliances, sensor devices, and home automation devices. The device specific affordances might vary significantly for IoT devices based on available hardware and user interfaces and controls.

End-user learning engine 122 of MCFSS 120 may be used to determine specific feedback queries, feedback content, or, more generally, other forms of content that are likely to be responded to or otherwise engaged with by a particular end-user based on the end user's determined preferences. End-user learning engine 122 may use information gathered about the end-user across multiple communication channels in assessing whether and how the end-user will respond to or interact with the content. Therefore, for example, how an end-user responded to a request for feedback via an IVR interaction can affect how the end-user is prompted for feedback via a web-based interaction. As another example, whether an end-user interacted with a particular type of content using a first communication channel may affect whether similar content is provided to the end user using a second communication channel and/or other content provided via the first communication channel. Client configuration engine 124 may control the specifics of the content, such as when content is presented, and how such content is presented for a specific client.

End-user feedback content delivery engine 126 may use data from end-user learning engine 122 and client configuration engine 124 to determine the content that should be provided to the end-user via a specific communication channel. Additional detail regarding end-user learning engine 122 and client configuration engine 124 is provided in reference to FIG. 2.

Figure 2:
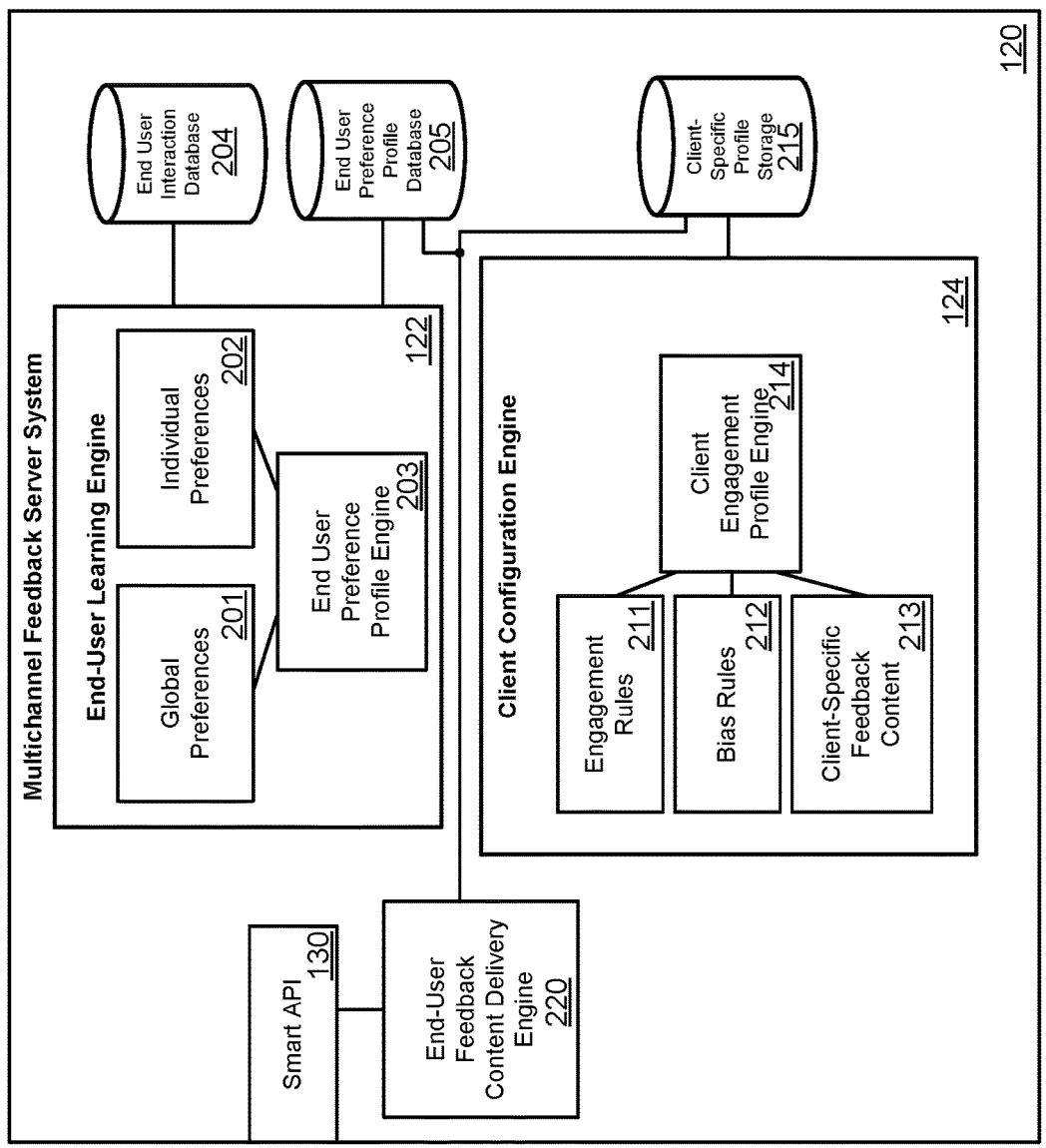
FIG. 2 illustrates an embodiment of a cloud-based multichannel end-user engagement and feedback server system which may function as part of an end-user multichannel feedback system.

FIG. 2 illustrates an embodiment 200 of cloud-based multichannel end-user feedback server system 120 which may function as part of an end-user multichannel feedback system, such as detailed in relation to FIG. 1. MCFSS 120, as detailed in relation to FIG. 1, may include end-user learning engine 122 and client configuration engine 124. End-user learning engine 122 and client configuration engine 124 can represent several processes that may be executed in parallel by MCFSS 120. End-user learning engine 122 is generally configured to create end-user preference profiles specific to individual end-users that define various likelihoods of an end-user providing feedback or otherwise responding to or interacting with content in particular types of formats and communication channels. Client configuration engine 124 is generally configured to create client engagement profiles which control and define the content that is output to end-users in specific ways and at specific times via the communication channels through which a particular client uses. For a given client and end-user, and end-user preference profile specific to the end-user and the client engagement profile specific to the client may be used to determine whether, when, how, and what content, such as feedback content, is delivered via smart API 130 to the end-user via the communication channel through which the end-user is currently engaging with the client.

Smart API 130 may function as detailed in relation to FIG. 1. Smart API 130 may receive an identifier indicative of a particular end-user and a client identifier indicative of a particular client. These identifiers may be received from the end-user computing system and/or from a client system. As an example, code may be embedded in a webpage serving the client system to the end-user computing system that includes a subtle engagement cue that when, activated by an end-user, triggers a request to be transmitted to MCFSS 120. This request may include the end-user identifier and the client identifier. Smart API 130 may receive such a request, may reformat data from the received request as needed, may route the reformatted data to end-user feedback content delivery engine 220 ("FCDE") or, more generally, content delivery engine 220, and may use stored profiles from end-user learning engine 122 and client configuration engine 124 to determine whether, how, and what feedback content should be provided to the end-user via the communication channel the end-user is currently using to interact with the client. Since the end-user is currently interacting with the client via a communication channel, it can be understood that FCDE allows for real-time feedback content to be provided to the end-user. That is, for example, while the end-user is interacting with a client's system for some reason, MCFSS 120 may determine what sort of active engagement feedback or content is to be provided to the user and such active engagement feedback or content may be provided while the end-user is interacting with the client's system. The term "micro moment" refers to the concept that content, such as a brief question to which a single piece of user input in response can be provided or a single piece of information, such as a phone number to contact, or message or advertisement, provided to the end-user typically can be interacted with quickly by the user. Typically, a micro moment interaction may take anywhere from a fraction of second to tens of seconds.

End-user learning engine 122 can represent a process that is periodically run for an individual end-user. End-user learning engine 122 may not be run specifically in response to when an end-user is communicating with a client system. Rather, for a particular end-user, end-user learning engine 122 may be executed by MCFSS 120 intermittently or periodically. End-user learning engine 122 may evaluate global preferences 201 and individual preferences 202. End-user interaction database 204 may store indications of various interactions for end-users associated with clients. Therefore, in end-user interaction database 204, entries may include an end-user identifier, a client identifier, and a feedback action taken by the end-user, which may be related to a particular communication channel. Therefore, if an end-user has interacted with a particular client via multiple communication channels, end-user interaction database 204 may store indications of such interactions that occurred via the multiple communication channels. These interactions can include indications of when the end-user ignored a request for feedback or another form of interaction, dismissed a request for feedback or another form of interaction, provided feedback or another form of interaction, the type of query or content to which feedback was provided, the communication channel used for such feedback or content, the situation for which feedback or content was provided, etc. Table 1 provides several sample entries which may be stored as part of end-user interaction database 204.

TABLE 1

| Client Identifier | End-User Identifier | Channel | Interaction |
|---|---|---|---|
| 34587623 | 12292138 | Website | Dismissed feedback question |
| 78823821 | 0029329 | Native Application | Answered "yes" to having a positive customer service experience |
| 34587623 | 22912009 | IVR | Did not answer survey question |

For a particular end-user with a particular client, individual preferences 202 may be extracted from end-user interaction database 204. Therefore, individual preferences 202 can represent how an end-user interacted with a particular client on various communication channels since the end-user has established relationship with the client. Individual preferences 202 may be compiled in the form of likelihoods. For example, a likelihood may be calculated as part of individual preferences 202 based on data extracted from end-user interaction database 204. This likelihood may indicate a percentage chance that the particular end-user, who has interacted with a subtle engagement cue on a client's website, will answer a yes/no feedback query regarding their satisfaction with the client. As another example, the likelihood may indicate a percentage change that the particular end-user, which has previously declined a request to provide feedback in response to a particular active engagement via an IVR system, will answer the same query presented in response to the end-user selecting a subtle engagement cue presented in a native application of the client.

For example, the following formula represents an exemplary preference calculation that may be performed to determine a likelihood of response to active engagement content on a particular channel. In equation 1, AEP refers to "active engagement presented" (content presented to the end-user, such as in response to selection of a subtle engagement cue); AER refers to "active engagement responses" (the end user actively provided a response) AED refers to "active engagement declines" (the end user closed the content or otherwise dismissed the content) and AEI refers to "active engagement ignores" (the end user took no action with regard to the content).

Likelihood of Response to Active Engagement = Eq. 1
$$\frac{AEP - AED - 0.5AEI}{AEP} * 100$$

As another likelihood calculation, equation 2 may be used to determine the likelihood of engagement in response to a subtle engagement cue on a particular communication channel. In equation 2, SEP refers to "subtle engagement cue presented;" and SEE refers to "subtle engagement cue engaged."

Likelihood of Engagement with Subtle Engagement Cue = Eq. 2
$$\frac{SEE}{SEP} * 100$$

Global preferences 201 may be based on how end-users of a particular client as a whole or end-users across multiple clients (e.g., all clients for which MCFSS 120 coordinates feedback) have responded to particular feedback queries or content on various communication channels. Global preferences may also be expressed as likelihoods. However, rather than being based on a particular end-user, global preferences are calculated across many end-users. This group of end-users may be specific to the client (e.g., all end-users for which MCFSS 120 provides feedback services for the client) or a group of end-users across multiple clients. That is, MCFSS, since it may provide feedback services from multiple clients, may compile global preference data across some or all of these clients. The likelihoods compiled as a part of global preferences 201 may mirror the likelihoods calculated on a per-end-user basis, but may reflect a set of end-users as a whole. Therefore, global preferences 201 may reflect the average end-user and can be useful in identifying how a new end-user for which no end-user-specific data is available.

End-user preference profile engine 203 can use global preferences 201 and individual preferences 202 to create an end-user preference profile for a particular end-user. Therefore each end-user preference profile may be based both on the individual end-user's preferences as determined across multiple communication channels and general preferences determined from multiple end-users for the particular client or across multiple clients. A weight, which can be varied based on the amount of individual preferences available, may be used to calculate the end-user preference profile based on global preferences 201 and individual preferences 202. As an example, global preferences 201 may be particularly useful for determining likelihoods for the end-user relating to a communication channel through which the end-user has not interacted with the client as of yet. The end-user preference profile created by end-user preference profile engine 203 may express likelihoods of how an end-user will respond to particular feedback requests. Once created, the end-user preference profile may be stored to end-user preference profile database 205.

Client configuration engine 124 may be used to create a client engagement profile specific to client. For a particular client, engagement rules 211, bias rules 212, and client-specific feedback content 213 may be used by client engagement profile engine 214 to create a client engagement profile. Each client engagement profile that is specific to a client may be stored to client-specific profile storage 250. As such, when FCDE 220 is to determine whether, when, how, and what feedback is to be sought from an end-user via a particular communication channel, the client engagement profile for the particular client may be retrieved from client-specific profile storage 215 along with the end-user preference profile from end-user preference profile database 205.

Client-specific feedback content 213 (or, more generally, Client-specific content 213) may reflect particular questions, inquiries, information, or other content the client desires to have presented to end-users. For example, in some instances the content may include specific feedback questions that the client desires to be asked of end-users or instructions or links for the end-user to engage with the client via a different communication channel. The feedback questions may be channel-agnostic. In some embodiments, specific content may be designated as intended for specific communication channels. Client-specific feedback content 213 may, rather than posing a question for feedback, direct the end-user to another resource or communication channel. For example, client-specific feedback content 213 may, in certain instances, provide a phone number for the end-user to obtain immediate support from a live client representative. As another example, client-specific feedback content 213 may provide a link to a chat room through which the end-user can directly interact with a client represent.

Engagement rules 211 may define the how and when of presentation of client-specific feedback content 213. For each communication channel, a client may configure engagement rules that define at what point in the communication flow content from client-specific feedback content 213 is output via the communication channel to the end-user. Engagement rules 211 may also define the format in which client-specific feedback content 213 is present. Engagement rules can include rules such as: new end-users are always shown a particular piece of content over a particular communication channel; users of a certain feature of the client are presented a particular piece of content; high value customers, as defined by the client, are not shown content on a particular channel; end users physically located on the west coast of the United States are presented contact information for a west-coast focused service center, etc.

Bias rules 212 may be used to define by the client how an end-user's preference profile is to affect content output to the end-user. Bias rules 212 may be defined in terms of percentages. For instance, bias rules 212 may state that, for particular clients, if there is greater than a 30% chance that a user will answer a survey question when he has engaged with a subtle engagement cue on a website, a first piece of client-specific feedback content may be presented in response. However, if there is less than 30% chance that the user will answer survey question when he has engaged with a subtle engagement cue on the website, a different second piece of client-specific feedback content may be presented in response. Therefore, each individual client can define particular bias rules 212 that he used to define what client-specific feedback content is presented based on the likelihoods present in an end-user's preference profile.

Client engagement profile engine 214 may process a client's defined engagement rules 211, bias rules 212, and client-specific feedback content 213 to create a client-specific engagement profile. This client-specific engagement profile may define whether, how, and in what format feedback content is provided to the end-user for multiple communication channels.

When an indication is received via smart API 130 that an end-user has engaged with a subtle engagement cue or the client system is requesting MCFSS 120 provide active engagement, FCDE 220 may retrieve the end-user's preference profile and the client-specific engagement profile. FCDE 220 may process the client-specific engagement profile based on the end-user's preference profile to determine content that should be output to the end-user via smart API 130. Any response received from the end-user (which could include the end-user providing an interaction in response to the feedback content or, more generally, content) may be logged in end-user interaction database 204 or another database.

Figure 3:
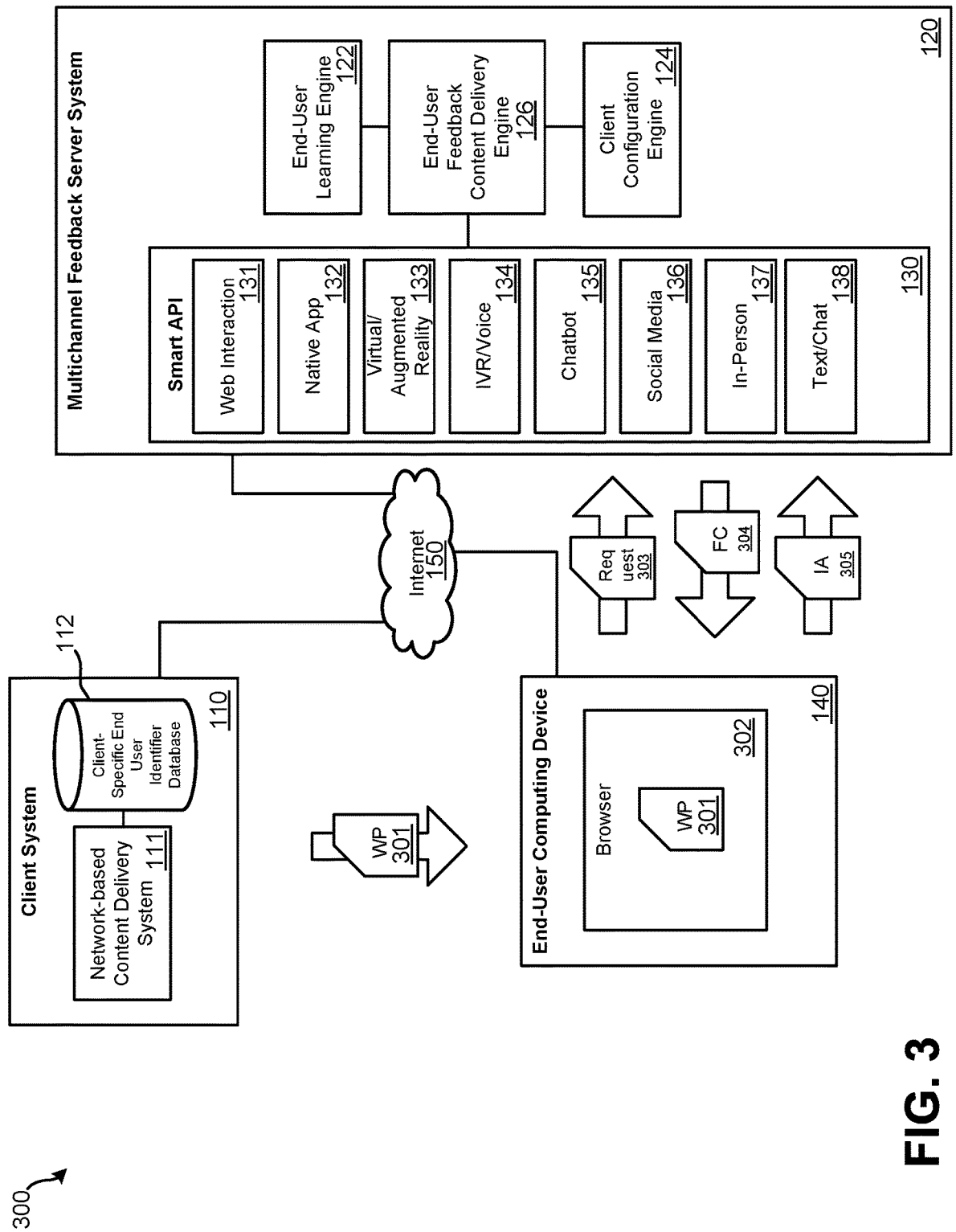
FIG. 3 illustrates an embodiment of an end-user multi-channel engagement and feedback system in which an end-user is interacting with a client system via a webpage served to an end-user computing system.

FIG. 3 illustrates an embodiment 300 of an end-user multichannel engagement and feedback system in which an end-user is interacting with a client system via a webpage served to an end-user computing system. Embodiment 300 represents an example of how these systems detailed in relation to FIGS. 1 and 2 may provide content, such as feedback content, to an end-user and gather responses to such feedback via a web-based communication channel. The code embedded in webpage 301 may, for example, be:

```
<!--Please login to apps.ignitefeedback.com to change your behavior-->
<script type='text/javascript'>window._igniter = window._igniter || [ ];
window._igniter.push(['or-XLb02',
'https://apps.ignitefeedback.com']);</script>
<script src='https://apps.ignitefeedback.com/assets/javascripts/igniter.js'
async></script>
```

In response to request 303, client system 110 may serve webpage 301 to browser 302 of end-user computing device 140. Embedded in webpage 301 may be an identifier linked with the end-user and a subtle engagement cue. Once presented, if the end-user does not interact with the subtle engagement cue, no communication between end-user computing device 140 and MCFSS 120 may occur. In some embodiments, indication may be received by MCFSS 120 that the user has not interacted with the subtle engagement cue. If the end-user does interact with the subtle engagement cue on webpage 301 as presented by browser 302, a request may be transmitted by end-user computing device 140 based on code embedded in webpage 301 to MCFSS 120. This request may indicate the client, such as a client identifier that is embedded in the code, and the end-user identifier which can also be embedded in the code. Additionally or alternatively, MCFSS 120 may infer inaction from the lack of received interaction data 305. Such lack of a response to MCFSS 120 may be indicative of the end-user ignoring or dismissing the content.

Request 303 may be received by web interaction component 131 of smart API 130. Smart API 130 may route the request to FCDE 126. FCDE 126 may retrieve an end-user preference profile and a client engagement profile as created by end-user learning engine 122 and client configuration engine 124, respectively. The end-user preference profile may be based on end-user interactions across multiple communication channels. Based on an analysis of the client engagement profile in combination with end-user-specific information obtained from the end-user preference profile, feedback content, which can be understood as "micro" feedback content or a "micro-moment" due to the ability of an end user to quickly review and interact with such content, may be output via web interaction component 131 of smart API 130 for presentation as part of webpage 301. This may involve script code of webpage 301 presenting the content as an overlay or in relation to the subtle engagement cue. For instance, feedback content 304 (or content 304) may replace the subtle engagement cue on webpage 300. An end-user may or may not interact with the feedback content presented as part of webpage 301. The end-user's interaction or non-interaction may be used to transmit interaction data 305 to MCFSS 120. Interaction data 305 may include data that indicates: the feedback content 304 was ignored by the end-user, the feedback content 304 was closed by the end-user, or an answer by the end-user to the feedback content 304 (e.g., an answer to a question posed by feedback content 304).

Figure 4:
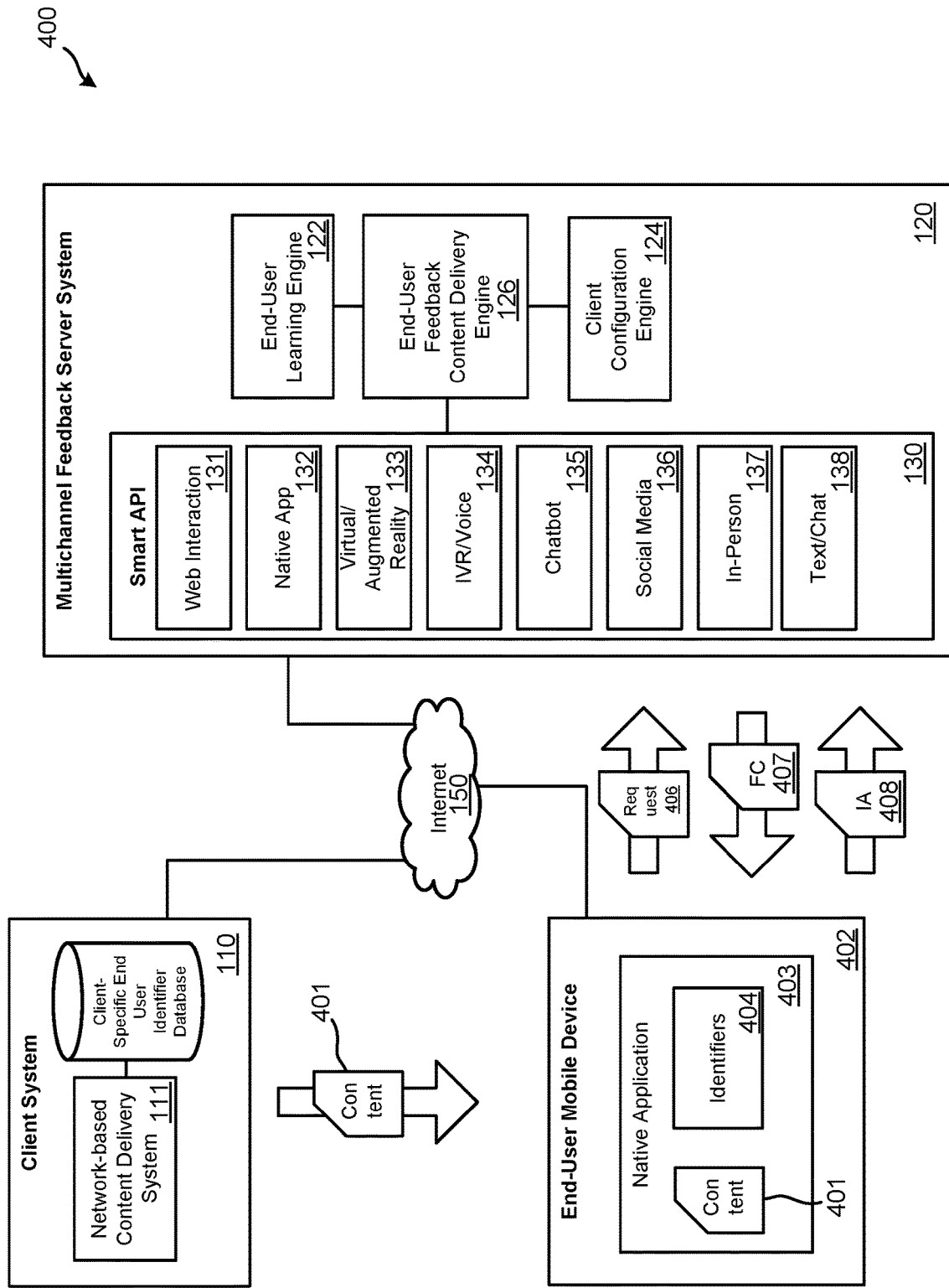
FIG. 4 illustrates an embodiment of an end-user multi-channel engagement and feedback system in which an end-user is interacting with a client system via a native application executed by an end-user mobile device.

FIG. 4 illustrates an embodiment 400 of an end-user multichannel feedback system in which an end-user is interacting with a client system via a native application executed by end-user mobile device 402. Embodiment 400 represents an example of how these systems detailed in relation to FIGS. 1 and 2 may provide feedback content to an end-user and gather responses to such feedback via a native application based communication channel. In response to an end-user executing native application 403 on end-user mobile device 402, content 401 may be retrieved from client system 110. Stored by native application 403, content 401 may be identifiers 404, which can include an end-user identifier and the client identifier. Content 401 may be presented by native application 403 to the end-user of end-user mobile device 402. Native application 403 may include code that causes a subtle engagement cue to be presented to the end-user (or retrieves the subtle engagement cue from MCFSS 120). The subtle engagement cue may be presented when native application 403 is prompted to MCFSS 120 or as determined by native application 403 or based on an instruction from client system 110. If a user interacts with the subtle engagement cue, request 406 may be transmitted by native application 403 to native application component 132 of smart API 130.

If the user does not interact with the subtle engagement cue, no communication between end-user mobile device 402 and MCFSS 120 may occur. As such an inference can be made by MCFSS 120 that the end user did not engage. In other embodiments, an indication may be received by MCFSS 120 that the user has not interacted with the subtle engagement cue presented in native application 403. If the end-user does interact with the subtle engagement cue within native application 403, a request may be transmitted by end-user mobile device 402 based on code embedded in native application 403 to MCFSS 120. This request may indicate the client, such as a client identifier that is embedded in the code, and the end-user identifier which can also be embedded in the code or stored on end-user mobile device 402.

Request 406 may be received by native application component 132 of smart API 130. Smart API 130 may route the request to FCDE 126. FCDE 126 may retrieve an end-user preference profile and a client engagement profile as created by end-user learning engine 122 and client configuration engine 124, respectively. For the remainder of the example of FIG. 4, it is assumed that the end-user previously interacted with the client and MCFSS 120 in accordance with the example of FIG. 3. The end-user preference profile may have been updated in accordance with the end-user's interaction with MCFSS 120 of FIG. 3. Therefore, an interaction of the end-user provided through a first communication channel can affect content provided to the end-user via a second, different communication channel.

As previously noted, the end-user preference profile may be based on end-user interactions across multiple communication channels, including a web-based interaction as detailed in relation to FIG. 3. Based on an analysis of the client engagement profile in combination with end-user-specific information obtained from the updated end-user preference profile, feedback content, which can be understood as a feedback content 407, may be output via native application component 132 of smart API 130 for presentation within native application 403. This may involve code of native application 403 presenting the feedback content as an overlay or in relation to the subtle engagement cue within native application 403. For instance, feedback content 407, which can be an active engagement with the end user, may replace the subtle engagement cue within native application 403. An end-user may or may not interact with the feedback content presented within native application 403. The end-user's interaction or non-interaction may be used to transmit interaction data 408 to MCFSS 120. Interaction data 408 may include data that indicates the feedback content 407 was ignored by the end-user, the feedback content 407 was closed by the end-user, or an answer by the end-user to the feedback content 407 (e.g., an answer to a question posed by feedback content 407). Interaction data 408 may then be used to update an end-user interaction database (e.g., end-user interaction database 204 of FIG. 2) and, when eventually updated, the end-user preference profile of the end-user that is at least partially based on such end-user interactions.

Figure 5:
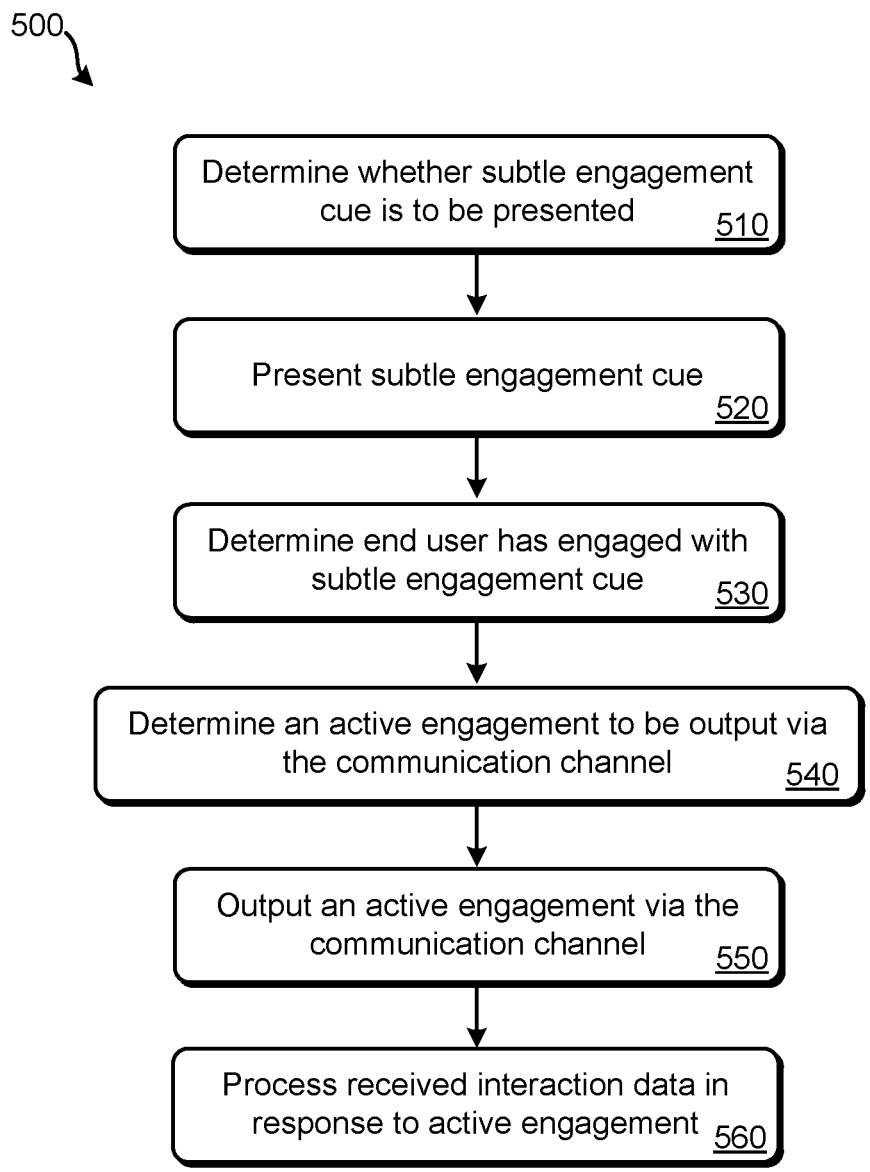
FIG. 5 illustrates an embodiment of a method for providing an end-user with feedback content.

FIG. 5 illustrates an embodiment of a method 500 for providing an end-user with feedback content. Method 500 may be performed using systems detailed in relation to FIGS. 1 through 4. Each step of method 500 may be performed using a multichannel feedback server system such as detailed in FIG. 1 and in FIG. 2.

At block 510, MCFSS may determine whether a subtle engagement cue is to be presented. In some embodiments, the subtle engagement cue may be coded into the webpage served by a client, native application, or other communication channel through which the end-user is communicating with a client. In other embodiments, the MCFSS may determine when a subtle engagement cue is to be presented via the communication channel in combination with the content of the client being interacted with by the end-user. That is, a call to the MCFSS may be made when, for example, the webpage is loaded by the end-user computing device. At block 510, a determination may be made that a subtle engagement cue is to be presented. Data may be transmitted to the end-user computing device which the end-user is using to interact with the client triggering presentation of the subtle engagement cue at block 520. If the determination of block 510 results in determining that a subtle engagement cue is not to be presented, no subtle engagement cue or active engagement may be presented for a period of time until block 510 is reevaluated.

At block 530, the determination may be made that an end-user has engaged the subtle engagement cue. The end-user may have clicked, tapped, or otherwise selected the subtle engagement cue. The specific input used to interact with the subtle engagement cue may be based on the communication channel through which the subtle engagement cue is being presented and the end-user is interacting with the client. The determination of block 530 may be based on a request being transmitted by the end-user computing device to the MCFSS indicative of engagement with the subtle engagement cue, an end-user identifier, and a client identifier.

At block 540, an active engagement in response to determining that the end-user has engaged the subtle engagement cue may be determined. This active engagement may be based on an end-user preference profile specific to the end-user and a client engagement profile specific to the client. The client engagement profile may be evaluated using data from the end-user preference profile to determine the form in the content that should be included in the active engagement. Once the active engagement has been determined at block 540, the active engagement may be output via the communication channel with which the user is interacting with the client at block 550. This active engagement may include one or more questions or opportunities for an end-user to provide feedback, or could potentially trigger a significant flow of interactions and activities, as desired by the client.

At block 560, interaction data received in response to the active engagement of block 550 may be processed. The interaction data received at block 560 may include an indication that the end-user has dismissed the active engagement output of block 550 or has ignored the active engagement output at block 550. The interaction data received at block 560 may, alternatively, indicate that the end-user has engaged with the active engagement of block 550. This interaction data may be used to update the end-user's preference profile. Therefore, since the end-user's preference profile includes a series of likelihoods of whether the end-user will engage with particular active engagement feedback content, if the end-user did not engage with the active engagement of block 550, various likelihoods related to the active engagement may be decreased (e.g., related to the channel, the content, the timing). Alternatively, if the end-user did engage the active engagement of block 550, various likelihoods related to be active engagement may be increased. This user preference profile may affect the output of active engagements via this communication channel and other communication channels for the end-user in the future.

Figure 6:
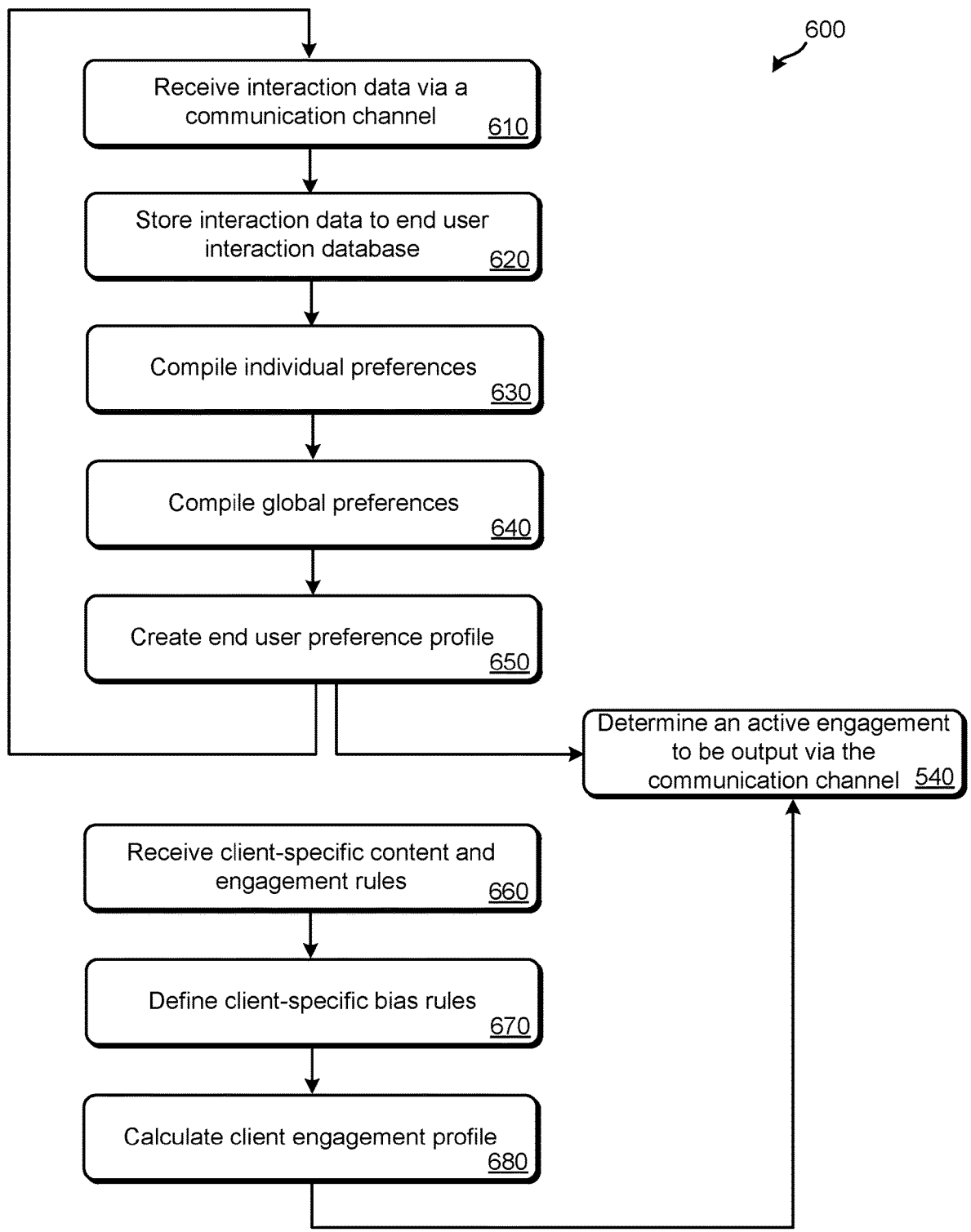
FIG. 6 illustrates an embodiment of a method for creating end-user preference profiles and client engagement profiles and using such profiles to determine feedback content for output to an end-user.

FIG. 6 illustrates an embodiment of a method 600 for creating end-user preference profiles and client engagement profiles and using such profiles to determine an active engagement for output to an end-user. Method 600 may be performed by a MCFSS, such as those detailed in relation to FIGS. 1-4. Method 600 may be performed in conjunction with method 500 of FIG. 5. While method 500 may be used to output content to an end-user via a communication channel currently being used by the end-user to engage with the client, method 600 may be used to create the end-user preference profiles and client-specific engagement profiles.

At block 610, interaction data may be received from an end-user via a communication channel, such as those detailed in relation to FIGS. 1 and 2. This interaction data may be in response to an active engagement provided by MCFSS via the communication channel to an end-user computing device. This interaction data may also be indicative of an end-user ignoring or dismissing an active engagement provided by MCFSS via the communication channel. This interaction data may be stored to an end-user interaction database at block 620. The interaction data stored at block 620 may be linked with an end-user identifier and a client identifier. As such, the interaction data can then later be attributed to a particular client and a particular end-user associated with that client. In some embodiments, it may be possible to identify a same end-user associated with multiple client identifiers. In other embodiments, each set of end-users associated with different clients is treated as a separate population.

At block 630, when a user's preference profile is to be created or updated, individual preferences associated with that end-user may be compiled. Therefore, entries in the end-user interaction database that are associated with a same end-user identifier and, possibly, client identifier may be compiled at block 630. These individual preferences may indicate how an end-user has reacted to active engagement attempts across multiple communication channels with the client. For example, if an end-user ignored an active engagement for the client through an IVR system but did engage with an active engagement for the client via a native application, these interactions may be reflected in the compiled individual preferences of block 630.

At block 640, global preferences may be compiled. Global preferences may indicate likelihoods of all or a sub-population of a client's end-users engaging with an active engagement request for various communication channels. Therefore, while individual preferences of block 630 are particular to a single end-user, global preferences reflect likelihoods related to multiple or all end-users associated with the particular client identifier. In some embodiments, global preferences may indicate likelihoods related to end-users across multiple client identifiers and, thus, interactions with multiple clients.

At block 650, an end-user preference profile may be created based on the compiled individual preferences of block 630 and the compiled global preferences of block 640. The end-user preference profile may be particular to a single end-user. Therefore, this end-user preference profile may be accessed and used when the end-user is to be provided in active engagement opportunity by the MCFSS. The end-user preference profile may be stored at block 650 until the end-user communicates with MCFSS via a communication channel or the end-user preference profile is to be updated again, such as due to changes in individual preferences and/or global preferences.

At a different time, or in parallel while block 610 to 650 are being executed, a client engagement profile specific to a particular client may be created. At block 660, client-specific content and engagement rules may be received. This client-specific content and the engagement rules may be provided by a client based on the information the client desires to be presented to an end-user and how and when and through what communication channels such content should be present. At block 670, the client may define client-specific bias rules. Client-specific bias rules may define thresholds based on likelihoods that are retrieved from end-user preference profiles to determine how, when, and what active engagements are presented to the end-user. For instance, a user may be required to have a higher likelihood than a threshold likelihood for responding to active engagements via a particular communication channel for a certain active engagement to be output to an end-user computing system; otherwise, no active engagement or a different active engagement may be output to the end-user.

At block 680, a client engagement profile may be created based on the client-specific bias rules of block 670 and the client-specific content engagement rules of block 660. The client engagement profile 680 may be understood as a branching flow chart that defines particular active engagements, timing, and decisions on when active engagements should be presented to an end-user via the communication channel through which the end-users communicating with the client and likelihoods present in the preference profile associated with the end-user.

The client engagement profile created at block 680 and the end-user preference profile created at block 650 may be used as part of block 540, which was detailed in relation to FIG. 5, to determine the active engagement to be output via the communication channel through which the user is communicating with the client. Additionally, at block 540, it may be determined how and when the active engagement should be presented to the end-user. For example, within a native application, there may be multiple ways of presenting an active engagement, such as by deactivating all other content within the native application and requiring the end-user to interact with the active engagement or by presenting the active engagement in only a portion of the presented native application and allowing the end-user to continue interacting with other content provided by the client in the native application.

Figure 7:
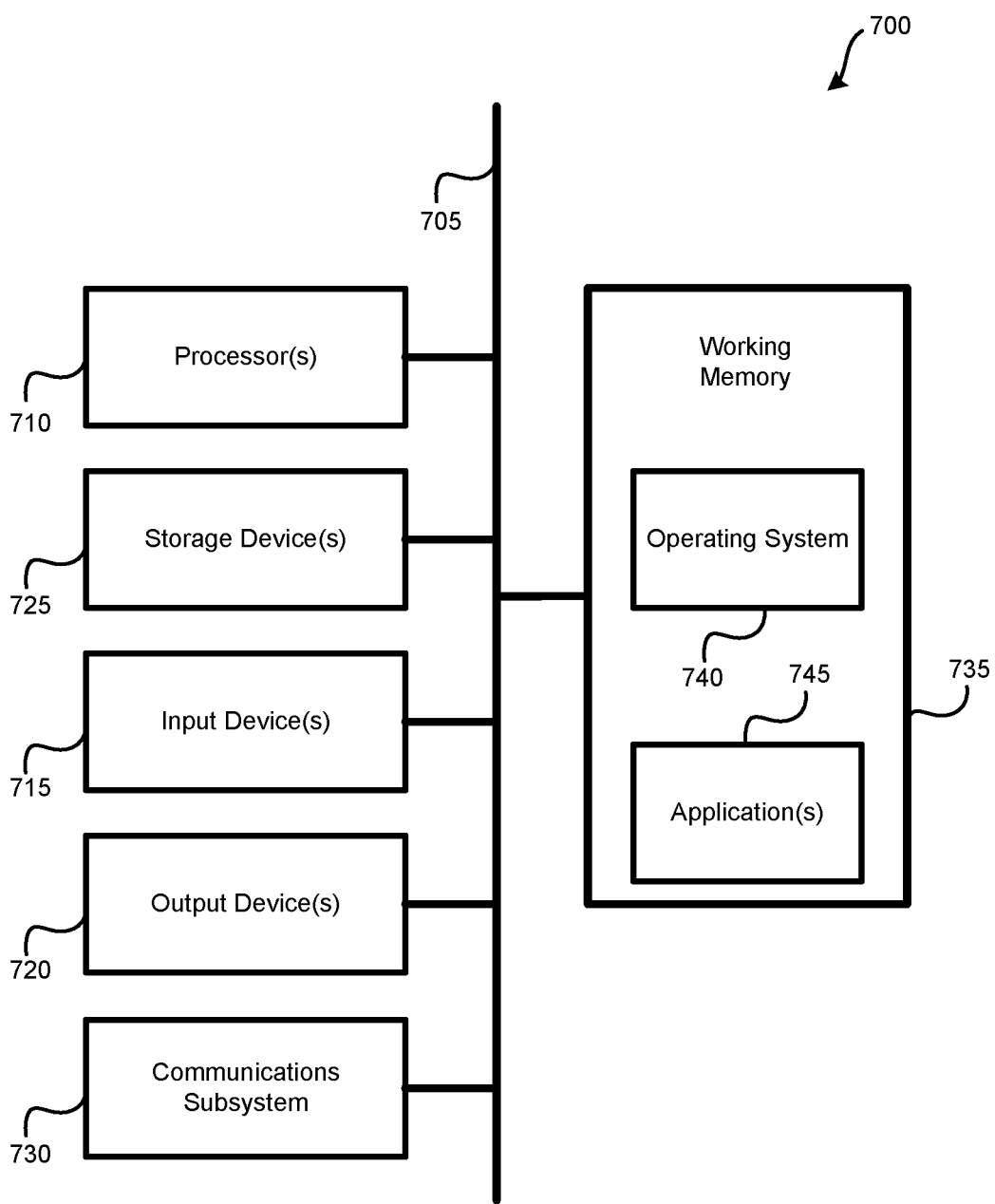
FIG. 7 illustrates computerized components which can be incorporated as part of various computerized devices and systems.

A computer system as illustrated in FIG. 7 may be incorporated as part of the previously described computerized devices, such as the end-user computing devices, client systems, multichannel feedback server systems, and end-user mobile devices. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a touchscreen, keyboard, remote control, and/or the like; and one or more output devices 720, which can include without limitation a display device, a printer, etc.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/ or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A multichannel end-user content system, comprising:
   a multichannel content server system comprising:
      an application programming interface (API) for interfacing with a plurality of end-user communication channels;
      an end-user interaction database that maintains entries for a plurality of end-users, wherein:
         for at least one end-user, an end-user-specific identifier is linked with a client identifier and a plurality of multichannel end-user interactions; and
         a first end-user interaction of the plurality of multichannel end-user interactions received by the multichannel content server system by the API based on a first engagement provided to the end-user via a first end-user communication channel of the plurality of end-user communication channels for a client;
   a processing system configured to:
      create an end-user-specific preference profile based on the first end-user interaction stored to the end-user interaction database;
      receive, via the API, a web-based request originating from an end-user computing device of an end-user of the plurality of end-users, wherein:
         the web-based request is indicative of the end-user engaging with the client via a second end-user communication channel of the plurality of end-user communication channels;
         the web-based request is generated based on the end-user activating an engagement element presented on a client-served web page; and
         the web-based request comprises the end-user-specific identifier and the client identifier;
      load and evaluate a client-specific engagement profile, from a plurality of client-specific engagement profiles, based on the created end-user-specific preference profile, the client-specific engagement profile providing a likelihood of end-user responsiveness to the activated engagement element on one or more of the plurality of the end-user communication channels;
      determine, based on the client-specific engagement profile evaluated based on the end-user-specific preference profile, web-based content to transmit to an end-user system to be output in association with the client-served web page; and
      cause the web-based content to be transmitted to the end-user system for presentation on the client-served web page, wherein the activated engagement element comprises a prompt that is secondary to primary content being presented to the end-user on the client-served web page.

2. The multichannel end-user content system of claim 1, wherein the processing system is further configured to:
receive, in response to the web-based content, an interaction message generated by the end-user computing device comprising: the end-user-specific identifier and an indication that the end-user has dismissed the web-based content;
store, to the end-user interaction database, an indication of the dismissed web-based content linked with an indication of the second end-user communication channel and the end-user-specific identifier; and
update the end-user-specific preference profile based on the end-user having dismissed the web-based content.

3. The multichannel end-user content system of claim 1, wherein creating the end-user-specific preference profile is further based on a set of global preferences, the set of global preferences defining likelihoods of the plurality of end-users interacting with a plurality of types of content.

4. The multichannel end-user content system of claim 1, wherein the end-user-specific preference profile is created based on interactions by the end-user with content via at least two end-user communication channels.

5. The multichannel end-user content system of claim 1, wherein the processing system is further configured to:
create the client-specific engagement profile based on:
client-provided content and client-specific bias rules, wherein:
the client-specific bias rules determine content to be provided to the end-user based on one or more likelihoods stored in the end-user-specific preference profile.

6. The multichannel end-user content system of claim 1, wherein the end-user-specific preference profile indicates a plurality of percentage likelihoods, at least one percentage likelihood indicating a likelihood that the end-user will perform a particular action.

7. The multichannel end-user content system of claim 2, wherein the processing system is further configured to:
receive, via the API, a second web-based request originating from the end-user system, wherein:
the second web-based request is generated based on the end-user activating a second engagement element on the client-served web page; and
the second web-based request comprises the end-user-specific identifier;
load and evaluate the client-specific engagement profile and the end-user-specific preference profile, wherein the end-user-specific preference profile is updated based on the indication of the dismissed web-based content;
determine, based on the executed client-specific engagement profile, a second piece of web-based content to transmit to the end-user system to be output in association with the client-served web page; and
transmit the second piece of web-based content to the end-user system for presentation in association with the client-served web page.

8. The multichannel end-user content system of claim 1, wherein the processing system is further configured to:
determine that the end-user has ignored the web-based content;
store, to the end-user interaction database, an indication of the ignored web-based content linked with an indication of the second end-user communication channel and the end-user-specific identifier; and
update the end-user-specific preference profile based on the end-user having ignored the web-based content.

9. The multichannel end-user content system of claim 8, wherein the processing system is further configured to:
receive, via the API, a second web-based request originating from the end-user computing device, wherein:
the second web-based request is generated based on the end-user activating a second engagement element on a second client-served web page; and
the second web-based request comprises the end-user-specific identifier;
load and evaluate the client-specific engagement profile based on the created end-user-specific preference profile, wherein the created end-user-specific preference profile is updated based on the ignored web-based request;
load and execute the client-specific engagement profile, using one or more end-user interactions received via the API and the indication of the ignored interactive web-based content;
determine, based on the client-specific engagement profile evaluated based on the end-user-specific preference profile, a second piece of web-based content to transmit to the end-user computing device to be output on the second client-served web page; and
cause the second piece of web-based content to be transmitted to the end-user computing device for presentation on the client-served web page.

10. The multichannel end-user content system of claim 1, wherein the API is configured to interact with an interactive voice response (IVR) system.

11. The multichannel end-user content system of claim 1, wherein the API receives requests from instances of a native application of the client being executed using end-user mobile devices and the first end-user communication channel is a native application communication channel.

12. The multichannel end-user content system of claim 1, wherein the API receives short messaging service (SMS) data from an end user mobile device and the first end-user communication channel is an SMS communication channel.

13. The multichannel end-user content system of claim 1, wherein the API receives chat communication data from an end user mobile device and the first end-user communication channel is a chat communication channel.

14. A method for managing multichannel end-user interactions, the method comprising:
receiving a first end-user interaction, in response to a first engagement provided to an end-user via a first end-user communication channel through which a first content is provided to an end-user computing device;
storing the first end-user interaction in association with an end-user-specific identifier to an end-user interaction database;
creating an end-user-specific preference profile for the end-user based on the first end-user interactions and global preferences of other end-users associated with the end-user;
receiving through a second end-user communication channel a request originating from the end-user computing device of the end-user, the request being generated based on the end-user activating an engagement element in second content presented on the end-user computing device, without interfering with a end user interaction with a primary content;
evaluating a client-specific engagement profile, from a plurality of client-specific engagement profiles, based on the created end-user-specific preference profile, the client-specific engagement profile providing a likelihood of end user responsiveness to the end-user activated engagement element through either the first end-user communication channel or the second end-user communication channel; and delivering content or at least one additional engagement to the end-user computing device via the second end-user communication channel.

15. The method for managing multichannel end-user interactions of claim 14, wherein the first end-user communication channel comprises an augmented reality interface and the first end-user interaction is received via the augmented reality interface.

16. The method for managing multichannel end-user interactions of claim 14, wherein the first end-user communication channel comprises an interactive voice response (IVR) system and the first end-user interaction comprises a vocal response received via the IVR system.

17. The method for managing multichannel end-user interactions of claim 14, further comprising:

receiving an interaction message generated by the end-user computing device comprising the end-user-specific identifier and an indication that the end-user has dismissed web-based content;

storing, to the end-user interaction database, an indication of the dismissed web-based content linked with an indication of the second end-user communication channel and the end-user-specific identifier; and updating the end-user-specific preference profile based on the end-user having dismissed the web-based content.

18. The method for managing multichannel end-user interactions of claim 14, wherein creating the end-user-specific preference profile is further based on a set of global preferences, the set of global preferences defining likelihoods of the plurality of end-users interacting with a plurality of types of content.

19. The method for managing multichannel end-user interactions of claim 14, wherein the end-user-specific preference profile indicates a plurality of percentage likelihoods, at least one percentage likelihood indicating a likelihood that the end-user will perform a particular action.

20. The method of claim 14, wherein the activated engagement element comprises a prompt that is secondary to primary content being presented to the end user on a client-served web page such that the activated engagement element attracts a end user attention without interfering with the end user interaction with the primary content.

* * * * *